United States Patent
Kim

[11] Patent Number: 6,094,318
[45] Date of Patent: Jul. 25, 2000

[54] METHOD AND APPARATUS FOR CONTROLLING DATA WRITE OPERATION ACCORDING TO FLYING HEIGHT OF TRANSDUCER HEAD

[75] Inventor: Gwan-Il Kim, Daegukwangyeok, Rep. of Korea

[73] Assignee: SamSung Electronics Co., Ltd., Suwon, Rep. of Korea

[21] Appl. No.: 09/053,077

[22] Filed: Apr. 1, 1998

[30] Foreign Application Priority Data

Apr. 8, 1997 [KR] Rep. of Korea ............... 97-12817

[51] Int. Cl.[7] .................... G11B 19/04; G11B 5/09
[52] U.S. Cl. .......................... 360/60; 360/46
[58] Field of Search .................. 360/31, 46, 53, 360/60

[56] References Cited

U.S. PATENT DOCUMENTS

| | | |
|---|---|---|
| 5,377,058 | 12/1994 | Good et al. |
| 5,588,007 | 12/1996 | Ma . |
| 5,777,815 | 7/1998 | Kasiraj et al. ............... 360/75 |
| 5,831,781 | 11/1998 | Okamura ................. 360/31 |
| 5,870,243 | 2/1999 | Ukani et al. ............... 360/53 |
| 5,909,334 | 6/1999 | Barr et al. ................. 360/53 |
| 5,941,998 | 8/1999 | Tillson ..................... 714/54 |

Primary Examiner—W. Chris Kim
Attorney, Agent, or Firm—Robert E. Bushnell, Esq.

[57] ABSTRACT

A data write control method of a hard disk di ive which can prevent the loss of data by sensing an abnormal flying height of a transducer head luring a data write operation. In the method, servo information is read from a write medium to compare an amplitude level of the servo information with a prescribed setting value. If the amplitude level of the servo information is less than the setting value, a flying height of a transducer head from the write medium is determined not suitable for the data write operation. A write disable flag is set to change the disk drive to a write non-ready state until the flying height of the transducer head is suitable for the data write operation.

10 Claims, 4 Drawing Sheets

*(Prior Art)*

METHOD AND APPARATUS FOR CONTROLLING DATA WRITE OPERATION ACCORDING TO FLYING HEIGHT OF TRANSDUCER HEAD

CLAIM FOR PRIORITY

This application makes reference to, incorporates the same herein, and claims all benefits accruing under 35 U.S.C. §119 from an application for METHOD FOR CONTROLLING DATA WRITE OPERATION ACCORDING TO FLYING HEIGHT OF HEAD earlier filed in the Korean Industrial Property Office on the Apr. 8, 1997, and there duly assigned Ser. No. 12817/1997, a copy of which application is annexed hereto.

BACKGROUND OF THE INVENTION

1. Technical Field

The present invention relates to a data write control method of a hard disk drive, and more particularly, relates to a method for controlling a data write operation by sensing an abnormal flying height of a transducer head.

2. Related Art

Hard disk drive is widely used as an auxiliary storage device of a computer system because its large storage capacity and data access speed. Each hard disk drive typically includes one or more magnetic disks installed at a driving axle of a spindle motor rotating at high speed and an actuator rotatably installed at a pivot axle to support a transducer head for writing or reading data in or from successive tracks of the disk. A bobbin and a coil are installed at one end of the actuator to rotate by operation of a voice coil motor. Then, the transducer head which is installed at a distal end of the actuator rotates in a radial direction of the disk for writing or reading data on or from the track. Generally, the transducer head moves while maintaining a minute flying height by an air flow generated by the high speed revolution of the disk. The movement of the magnetic head is caused by reproduction of servo information written in a servo sector of the disk.

A typical servo sector of an arbitrary track of the magnetic disk is composed of a preamble region for synchronizing with a system clock, a servo address mark (SAM) region for recording a reference pattern for producing various servo timing signals, an index (IDX) region for supplying single rotation information of the disks, a gray code region for providing identification (ID) information of each track, a servo burst region typically consisting of servo burst signals A, B, C and D for the on-track control of the heads, and a postamble region. The servo burst signals A and B are respectively written with a half value in adjacent tracks and used for the on-track control of the transducer head during track follow-up. The amplitude levels of the servo burst signals vary according to the position and the flying height of the transducer head. However, if the flying height of the transducer head is higher than a normal flying height because of external shock or poor surface uniformity of the disk, I have observed that it is difficult to perform data read/write operations. This is particularly acute if the data write operation is implemented while the transducer head maintains the flying height higher than the normal flying height. Data will be lost and abnormal data will be written onto the disk as described in U.S. Pat. No. 5,377,058 for a Fly Height Servo Control of Read/write Head Suspension issued to Good et al., and U.S. Pat. No. 5,588,007 for a Method for Detecting Transient Write Errors in a disk drive issued to Ma. While these servo control techniques provide reliable data storage reliability can still be contemplated.

SUMMARY OF THE INVENTION

Accordingly, it is therefore an object of the present invention to provide an improved disk drive with increased data storage reliability.

It is also an object to provide a disk drive and a method for providing data storage assurance during data write operations.

It is further an object to provide a disk drive and a data write control method for preventing loss of data during data write operation when the flying height of a transducer head is not suitable for data write operations.

It is yet another object to provide a disk drive and a data write control method for reading servo information from a disk, comparing an amplitude level of the servo information with a prescribed setting value, when the amplitude level of the servo information is less than the setting value, setting a write disable flag for preventing data loss due to an abnormal flying height of a transducer head.

These and other objects of the present invention can be achieved by a hard disk drive which comprises a data recording disk having a plurality of concentric tracks with each track having servo sectors in which servo information for use in positioning a transducer head is written and succeeding data sectors, each servo sector including a preamble region for providing a gap before the servo sector and providing a timing margin needed to change a data write operation to a data read operation, a servo address mark region for providing synchronization, an index region for providing index information of the disk, a gray code region for providing identification information of each track, a servo burst region for providing servo burst signals for servo position information, and a postamble region for providing a timing margin after the servo burst signals are read. The transducer head is used for writing data to and reading data from the data sectors of the data recording disk, and for reading servo position information from the servo sectors of the data recording disk. An actuator assembly is connected to position the transducer head across the tracks for performing the data read operation and the data write operation. A controller is designed to prevent loss of write data during the data write operation, when a flying height of said transducer head is not suitable for the data write operation by a series of steps of reading amplitude levels of first and second servo burst signals from the disk; combining the amplitude levels of the first and second servo burst signals read through the transducer head; comparing a combined value of the amplitude levels of the first and second servo burst signals with a prescribed setting value; and when the combined value is less than the prescribed setting value, determining that the flying height of the transducer head from the disk is not suitable for the data write operation, and holding the data write operation in reserve until the flying height of the transducer head from the disk is suitable for the data write operation.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figures 1, 2:
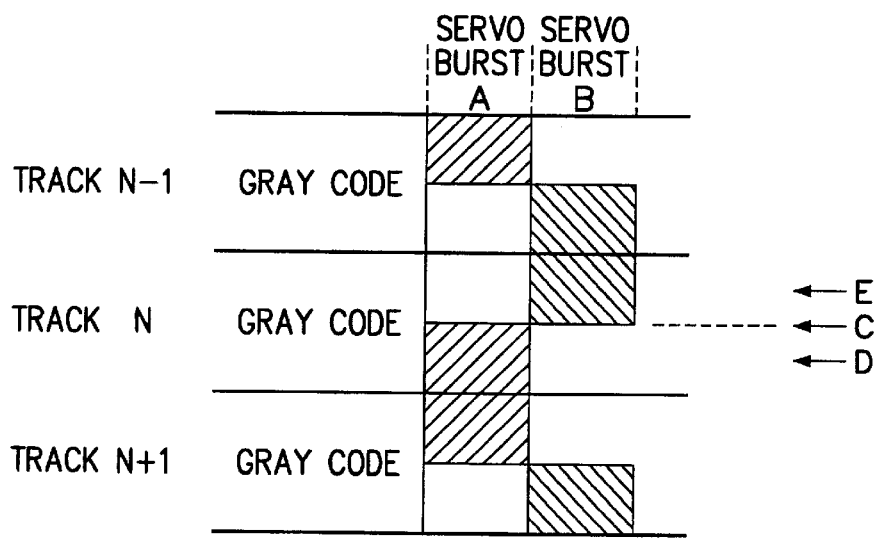
FIG. 1 illustrates a general format of a servo sector of an arbitrary track.
FIG. 2 illustrates a write pattern of servo burst signals A and B used for controlling position of a transducer head.

Referring now to the drawings and particularly to FIG. 1, which illustrates a general format of a servo sector of an arbitrary track including a preamble region, a servo address mark (SAM) region, an index (IDX) region, a gray code region, a servo burst region, and a postamble region. The preamble provides a gap before the servo sector and provides a timing margin needed to change a data write operation to a data reproducing operation. The servo address mark (SAM) is a non-signal area and provides synchronization for reproducing a gray code by informing that the servo is started. The index information provides one-rotation information of the disk. The gray code typically consists of 12 bits and provides identification (ID) information of each track. In a servo burst (A, B, C and D) area, servo burst signals A, B, C and D are used for controlling the position of the transducer head. The postamble provides a timing margin after the servo information is read.

FIG. 2 illustrates a write pattern of the servo burst signals A and B used for controlling the position of the transducer head. The servo burst signals A and B are respectively written with a half value in adjacent tracks and used for the on-track control of the transducer head during track following. That is, the transducer head is accurately situated on a center line of the track by controlling the position of the transducer head so that the difference between amplitude levels of the servo burst signals A and B read through the transducer head can be zero ("0").

Figures 3A, 3B, 3C, 3D:
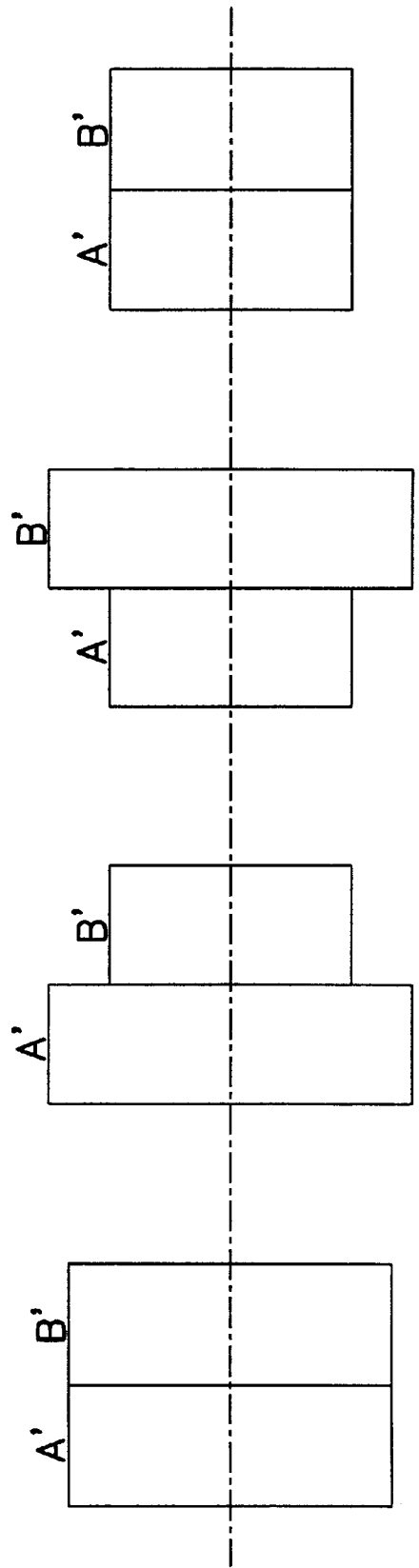
FIGS. 3A to 3D are characteristic diagrams of amplitude levels of servo burst signals A and B varying according to the position of a transducer head.

FIGS. 3A to 3D are characteristic diagrams of the amplitude levels of the servo burst signals A and B varying according to the position of the transducer head. In FIGS. 3A to 3D, reference symbols A' and B' show the amplitude levels of the servo burst signals A and B read through the transducer head. FIG. 3A illustrates the amplitude levels of the servo burst signals A and B when the transducer head is situated at a center line C of a track N shown in FIG. 2. FIG. 3B illustrates the amplitude levels of the servo burst signals A and B when the transducer head is situated at a 10% off-track point D from the center line C of the track N. In such situation, the amplitude level of the servo burst signal A is greater than that of the servo burst signal B since the transducer head is 10% off-track toward a track N+1. FIG. 3C illustrates the amplitude levels of the servo burst signals A and B when the transducer head is situated at a −10% off-track point E from the center line A of the track N. The amplitude level of the servo burst signal B is greater than that of the servo burst signal A. FIG. 3D illustrates the amplitude levels of the servo burst signals A and B when the transducer head has an abnormal flying height on the center line C of the track N. The amplitude levels of the servo burst signals read through the transducer head may vary according to the off-track position and the flying height of the transducer head. However, even if the transducer head is off-track within an on-track window interval, the sum of the amplitude levels of the servo burst signals A and B read through the transducer head is constant. In addition, the sum of the amplitude levels of the servo burst signals A and B read when the flying height of the transducer head which is abnormally raised is less than the amplitude levels of the servo burst signals A and B read when the transducer head is off-track.

As I have noted earlier, if the transducer head maintains a flying height higher than a normal flying height due to external shock or poor surface uniformity of the disk, it is difficult to perform data read/write operations. In particular, if the data write operation is implemented while the transducer head maintains the flying height higher than the normal flying height, data is lost and abnormal data is written into the disk.

Figure 4:
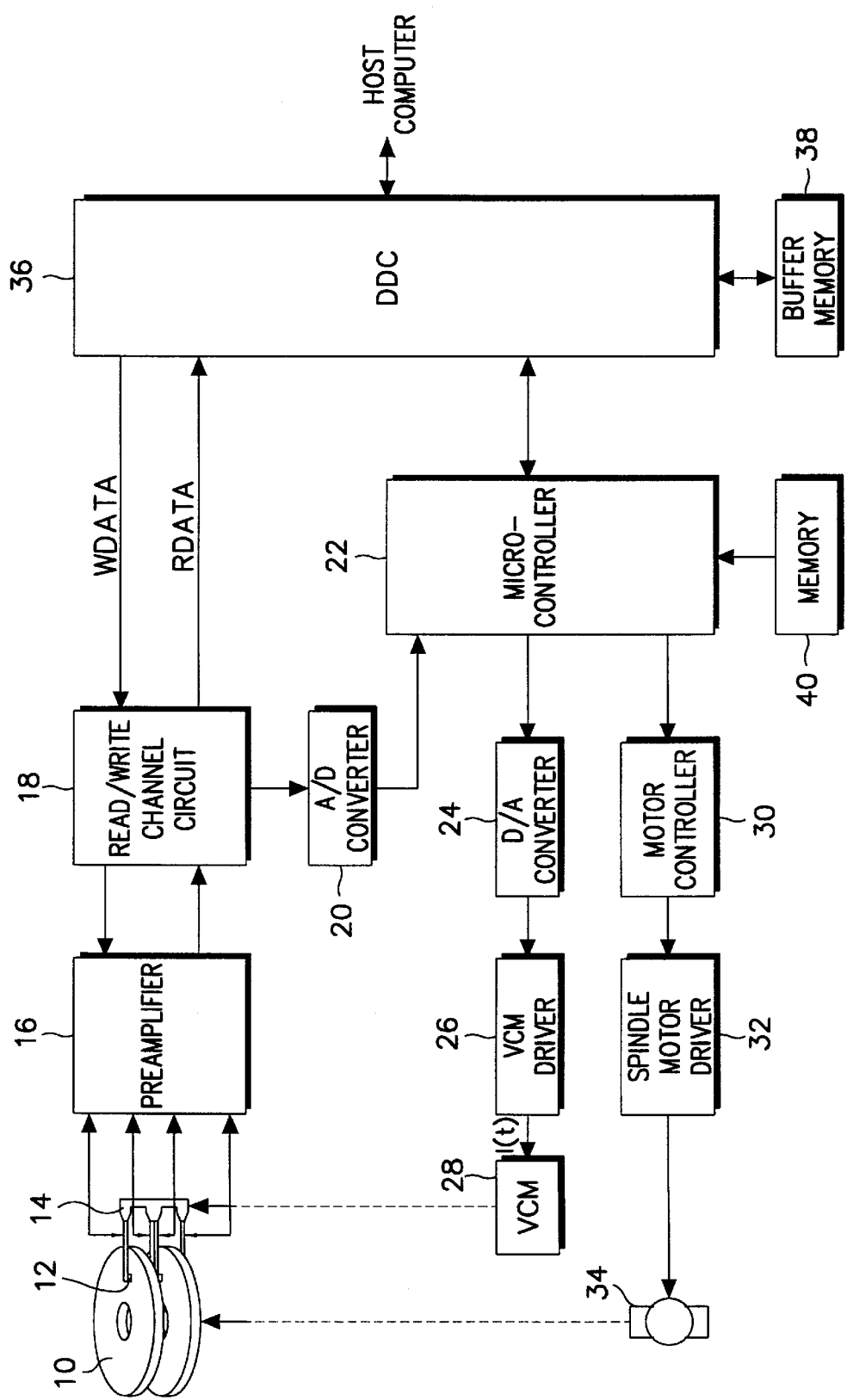
FIG. 4 is a block diagram of a system configuration of a hard disk drive constructed according to the principles of the present invention.

Turning now to FIG. 4 which illustrates a system configuration of a hard disk drive constructed according to the principles of the present invention. The HDD includes, for example, two magnetic disks 10 and corresponding four transducer heads 12, a transducer head assembly 14 in an E-shape having actuator arms each for supporting a respective pair of transducer heads 12, a preamplifier 16, a read/write channel circuit 18, an analog-to-digital (A/D) converter 20, a micro-controller 22, a digital-to-analog (D/C) converter 24, a voice coil motor (VCM) driver 26, a voice coil motor 28, a motor controller 30, a spindle motor driver 32, a spindle motor 34 for rotating the magnetic head 12 across the surface of the disk 10, a disk data controller (DDC) 36, a buffer memory 38 connected to the DDC 36, and a main memory 40 connected to the micro-controller 22.

Disks 10 are installed in a stack at a driving axle of the spindle motor 34. Each surface of the disks 10 corresponds to one transducer head. Each disk 10 has a plurality of tracks of a concentric arrangement and includes a parking zone on which the transducer head 12 is situated when the disk drive is not used (that is, when a power source is OFF). The transducer heads 12 are positioned on the surfaces of the disks 10 and installed at extended arms 14 of an arm assembly of the rotary voice coil motor (VCM) 28.

Preamplifier 16 is electrically connected to the transducer head assembly for amplifying, during a data read operation, a read signal picked up by one of the transducer heads 12 and supplying the amplified signal to the read/write channel circuit 18. During a data write operation, the preamplifier 16 writes encoded write data transmitted from the read/write channel circuit 18 into the disk 10 by driving one of the heads 12. In this case, the preamplifier 16 selects one of the heads 12 under control of the disk data controller (DDC) 36.

Read/write channel circuit 18 is connected between the preamplifier 16 and the DDC 36 for decoding data pulses from the read signal received from the preamplifier 16 to supply read data RDATA to the DDC 36, and for decoding write data WDATA received from the DDC 36 to transmit the decoded data WDATA to the preamplifier 16. The read/write channel circuit 18 also demodulates head position information which is one of servo information written into the disk 10 to generate a position error signal (PES). The position error signal generated from the read/write channel circuit 18 is supplied to the A/D converter 20. The A/D converter 20 converts the position error signal into a corresponding digital step value and supplies the digital value to the microcontroller 22. The DDC 36 writes data received from a host computer into the disk 10 through the read/write channel circuit 18 and the preamplifier 16, or supplies data read from the disk 10 to the host computer. The DDC 36 also interfaces communication between the host computer and the microcontroller 22.

Micro-controller 22 controls the DDC 36 in response to a read/write command received from the host computer and controls track seek and track following. The microprocessor 22 adds digital conversion values of the servo burst signals A and B generated from the A/D converter 20 to sense the flying height of the transducer head 12 and controls the data write operation in response to the flying height of the transducer head 12 according to the present invention. Moreover, the microcontroller 22 performs servo control in response to servo control related signals generated from a gate array (not shown). The D/A converter 24 converts a head position control output value U(k) generated from the micro-controller 22 into an analog signal.

VCM driver 26 supplies, to the VCM 28, a driving current I(t) for driving an actuator by the analog signal transmitted from the D/A converter 24. The VCM 28 situated at one end of the actuator horizontally shifts the heads 12 onto the disks 10 in response to the direction and level of the driving current I(t) generated from the VCM driver 26. The motor controller 30 controls a spindle motor driver 32 according to a disk rotation control value generated from the microcontroller 22. The spindle motor driver 32 rotates the disks 10 by driving the spindle motor 34 by the control of the motor controller 30. The buffer memory 38 connected to the DDC 36 temporarily stores data transmitted between the host computer and the disks 10 by the control of the DDC 36. The memory 40 connected to the microcontroller 22 includes a read only memory (ROM) for storing a control program according to the present invention and a random access memory (RAM) for storing data generated during drive control.

Figure 5:
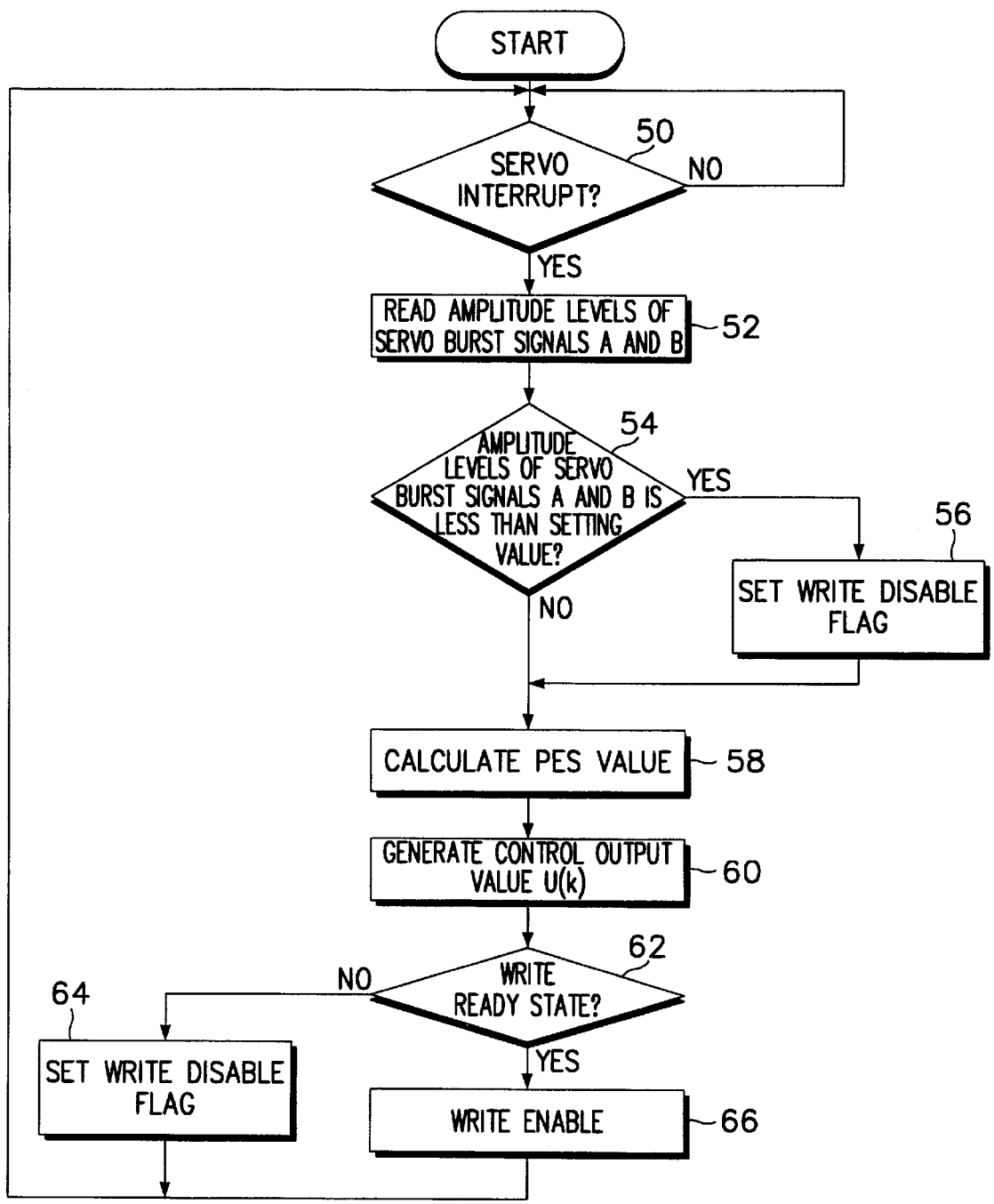
FIG. 5 is a flow chart illustrating a data write control process of the disk drive according to the principles of the present invention.

FIG. 5 illustrates a data write control process of a disk drive for preventing loss of write data in a disk drive when the flying height of a transducer head is abnormal according to the principles of the present invention. The data write control process is implemented during a track seek mode. As shown in FIG. 5, the micro-controller 22 first determines whether a servo interrupt is generated at step 50. If the servo interrupt is generated at step 50, the micro-controller 22 senses that a current sector is a servo sector and reads the amplitude levels of the servo burst signals A and B through the A/D converter 20 at step 52. The micro-controller 22 can sufficiently sense variations in the amplitude levels of the servo burst signals A and B by holding a value of an automatic gain controller (AGC) within the preamplifier 16 or by slowly operating the AGC. At step 54, the microcontroller 22 determines whether the sum of the amplitude levels of the servo burst signals A and B is less than a setting value. In this situation, the setting value represents a minimum value which can lose data due to the abnormal flying height of the transducer head 12. If the sum of the amplitude levels is not less than (i.e., greater than) the setting value at step 54, the micro-controller 22 calculates a PES value at step 58. At step 60, the micro-controller 22 generates the control output value U(k) corresponding to the PES value. At step 62, the micro-controller 22 checks whether the disk drive is in a write ready state. If the disk drive is in a write ready state at step 62, the micro-controller controller 22 enables a write gate signal for writing data into a target data sector of the disk at step 66 and returns to step 50. If the disk drive is not in a write read state at step 62, the microcontroller 22 sets a write disable flag at step 64 and returns to step 50 to repeatedly execute the above-described data write process.

Meanwhile, if the sum, or combined value, of the amplitude levels of servo burst signals A and B is less than the setting value at step 54, the micro-controller 22 senses that the transducer head is in an abnormal flying height and sets the write disable flag to change the disk drive to a write non-ready state at step 56. Thereafter, the microcontroller 22 executes steps 58 and 60. Since the disk drive is in a write non-ready state, the micro-controller 22 returns to step 50 through step 62 and 64 to repeatedly carry out the above-described data write control process to repeatedly provide one or more successive combined values of the amplitude levels of servo burst signals A and B, as necessary. If the sum of the amplitude levels is greater than the setting value, the micro-controller 22 enables the write gate signal at step 66 to write data into the target data sector of the disk. Therefore, the loss of write data which may be generated by the abnormal flying height of the transducer head during the data write operation can be prevented.

As described above, when the flying height of the transducer head is not suitable for the data write operation, the data write operation is reserved until the transducer head maintains the normal flying height. Hence, the loss of the write data can be prevented.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for controlling a data write operation in a disk drive in which servo information is written on a medium, said method comprising the steps of:

reading a plurality of amplitude levels of said servo information from said medium;

comparing a sum of said plurality of amplitude levels of said servo information with a prescribed setting value;

when said sum of said plurality of amplitude levels of said servo information is less than said prescribed setting value, determining that a flying height of a transducer head from said medium is not suitable for said data write operation, and setting a write disable flag to change the disk drive to a write non-ready state for said data write operation;

when said sum of said plurality of the amplitude levels of said servo information is not less than said prescribed setting value, indicating that the flying height of said transducer head from said medium is suitable for said data write operation, changing the disk drive when in the write non-ready state from the write non-ready state to a write ready state enabling said data write operation and when said sum of said plurality of amplitude levels is not less than said prescribed setting value, enabling said data write operation.

2. The method of claim 1, further comprised of said servo information including a plurality of servo burst signals used for on-track control of said transducer head.

3. The method of claim 2, further comprised of said prescribed setting value indicating a minimum flying height of said transducer head below which the disk drive begins to lose write data during said data write operation, said prescribed setting value being defined when said transducer head is at a flying height.

4. The method of claim 1, further comprised of said medium corresponding to a magnetic disc.

5. A method for controlling a data write operation in a disk drive in which a first servo burst signal and a second servo burst signal for controlling an on-track position of a transducer head are written on a medium, said method comprising the steps of:

reading an amplitude level of said first servo burst signal and said second servo burst signal written on said medium via said transducer head;

combining the amplitude level of said first servo burst signal and the amplitude level of said second servo burst signal read through said transducer head to provide a combined value;

comparing said combined value of the amplitude level of said first servo burst signal and the amplitude level of said second servo burst signal with a prescribed setting value;

when said combined value is less than said prescribed setting value, determining that a flying height of said transducer head from said medium is not suitable for said data write operation, and holding said data write operation in reserve until the flying height of said transducer head from said medium is suitable for said data write operation; and when said combined value is not less than said prescribed setting value, indicating that the flying height of said transducer head from said medium is suitable for said data write operation, enabling said data write operation.

6. The method of claim 5, further comprised of said prescribed setting value indicating a minimum flying height below which said disk drive begins to lose write data during said data write operation, and said prescribed setting value being defined by a combined value of an amplitude level of said first servo burst signal and an amplitude level of said second servo burst signal read from said medium when said transducer head is at a flying height.

7. The method of claim 5, further comprised of said medium corresponding to a magnetic disk.

8. A disk drive, comprising:

a data recording disk having a plurality of concentric tracks, each concentric track having servo sectors in which servo information is written and succeeding data sectors, each servo sector including a preamble region for providing a gap before a corresponding servo sector and providing a timing margin needed to change a data write operation to a data read operation, a servo address mark region for providing synchronization, an index region for providing index information of the data recording disk, a gray code region for providing identification information of each concentric track, a servo burst region for providing servo burst signals for servo position information, and a postamble region for providing a timing margin after the servo burst signals are read;

a transducer head for writing data to and reading data from the data sectors of the data recording disk, and said transducer head for reading servo position information from the servo sectors of the data recording disk;

means attached to the transducer head for positioning said transducer head across the concentric tracks to perform said data read operation and said data write operation; and a controller for preventing loss of write data during said data write operation, when a flying height of said transducer head is not suitable for said data write operation in dependence upon said servo burst signals, said controller preventing loss of write data by:

reading an amplitude level of a first servo burst signal and an amplitude level of a second servo burst signal from said data recording disk via said transducer head;

combining the amplitude level of said first servo burst signal and the amplitude level of the second servo burst signal read through said transducer head to provide a combined value;

comparing said combined value of the amplitude level of said first servo burst signal and the amplitude level of said second servo burst signal with a prescribed setting value;

when said combined value is less than said prescribed setting value, determining that the flying height of said transducer head from said data recording disk is not suitable for said data write operation, and holding said data write operation in reserve until the flying height of said transducer head from said data recording disk is suitable for said data write operation; and when said combined value is not less than said prescribed setting value indicating that the flying height of said transducer head from said data recording disk is suitable for said data write operation, said controller enabling said data write operation.

9. The disk drive of claim 8, further comprised of said controller enabling said data write operation when a successive said combined value resulting from a successive reading of an amplitude level of said first servo burst signal and an amplitude level of said second servo burst signal is no longer less than said prescribed setting value, when said data write operation is held in reserve.

10. The disk drive of claim 8, further comprised of said prescribed setting value indicating a minimum flying height of said transducer head before losing write data during said data write operation.

* * * * *